US006352786B2

(12) United States Patent
Arshinova et al.

(10) Patent No.: US 6,352,786 B2
(45) Date of Patent: Mar. 5, 2002

(54) FIRE RESISTANT CELLULOSIC MATERIALS

(75) Inventors: Rose P. Arshinova, Chesterfield; Edward J. Griffith, deceased, late of Manchester, both of MO (US), by Joseph E. Griffith, executor

(73) Assignee: Astaris LLC, St. Louis, MO (US)

( * ) Notice: Subject to any disclaimer, the term of this patent is extended or adjusted under 35 U.S.C. 154(b) by 0 days.

(21) Appl. No.: 09/764,759

(22) Filed: Jan. 18, 2001

Related U.S. Application Data

(62) Division of application No. 09/066,634, filed on Apr. 24, 1998, now Pat. No. 6,235,347.

(60) Provisional application No. 60/044,926, filed on Apr. 25, 1997.

(51) Int. Cl.[7] .......... B32B 23/04

(52) U.S. Cl. .......... 428/532; 428/536; 428/537.5; 428/537.7; 427/372.2; 106/18.14; 106/18.26; 106/18.31

(58) Field of Search .......... 428/532, 536, 428/537.5, 537.7; 427/372.2; 106/18.14, 18.26, 18.31

(56) References Cited

U.S. PATENT DOCUMENTS

| | | | | |
|---|---|---|---|---|
| 3,772,060 A | | 11/1973 | Birchall et al. | 117/69 |
| 3,785,845 A | | 1/1974 | Birchall et al. | 117/15 |
| 3,793,105 A | | 2/1974 | Birchall et al. | 156/106 |
| 3,801,362 A | | 4/1974 | Birchall et al. | 117/143 |
| 3,839,078 A | | 10/1974 | Burchall et al. | 117/119.6 |
| 3,969,291 A | | 7/1976 | Fukuba et al. | 260/17.3 |
| 4,015,050 A | | 3/1977 | Birchall et al. | 428/480 |
| 4,461,720 A | | 7/1984 | Loyvet et al. | 252/607 |
| 4,585,703 A | | 4/1986 | Taguchi et al. | 428/446 |
| 4,731,265 A | | 3/1988 | Hirao et al. | 427/440 |
| 4,734,136 A | | 3/1988 | Burow | 106/304 |
| 4,857,365 A | | 8/1989 | Hirao et al. | 427/297 |
| 4,981,518 A | | 1/1991 | Sachs | 106/691 |
| 5,096,539 A | | 3/1992 | Allan | 162/9 |
| 5,151,225 A | | 9/1992 | Herdon et al. | 252/607 |
| 5,503,920 A | | 4/1996 | Alkire et al. | 428/288 |
| 6,235,347 B1 | * | 5/2001 | Arshinova | 427/372.2 |

FOREIGN PATENT DOCUMENTS

| | | |
|---|---|---|
| FR | 2118013 | 12/1971 |
| JP | 48046195 | 7/1973 |

OTHER PUBLICATIONS

Derwent Abstract: "Silicate–based insulating moulded body prodn.—by reaction bonding foamed alkali silicate particles with mono aluminum phosphate": EP 634377; Date: 1995.

Derwent Abstract: "Wood fibreboard having flame resistance—has inorganic cpd., phosphate and borate filled in or stuck to cell holes and/or inner walls of cell holes of wood fibre, etc."; JP 6055507; Date: Mar. 1, 1994.

Derwent Abstract: "Fireproof wooden door—comprises skeleton material comprising parallel laminated wood obtd. By lmainating flameproof treated boards so fibre direction of boards are parallel and surface board"; JP4136390; Date: May 11, 1992.

Derwent Abstract: "Fireproof wooden door used in complex houses and tall buildings—obtd. By providing lumber surface board on lumber core prepd. By impregnating raw material in treating soln. contg. pref. borate(s), phosphate(s)"; JP 4136389; Date May 11, 1992.

Derwent Abstract: "Fireproof wood veneered door—comprises timber sheets, impregnated with fireproof inorganic material, either side of fireproof base material"; JP 4108976; Date: Apr. 9, 1992.

Derwent Abstract: "Lightweight inorganic material sheet for building use—comprises inorganic composite contg. microporous organic fibre(e.g. wood) treated with flame–retardant salt"; JP 3020000; Date: Mar. 29, 1991.

Derwent Abstract: "Modifying wood for use in building, etc.—by alternate impregnation with inorganic cation and anion, which react to form non–flammable cpd., using at least three stages"; DE 3805819; Date: 1988.

Derwent Abstract: "Modified wood prodn. for building materials—by impregnation with aq. solns. of inorganic matter fixing insoluble and non–flammable matter in wood tissues"; JP 63051102; Date Mar. 4, 1988.

Derwent Abstract: "Treating woody materials—using reaction prod. or mixt. of high molecular cpd., phosphonic acid cpd. and silicon, magnesium and/or calcium cpd"; JP 59122560; Date: 1984.

Derwent Abstract: "Impregnating wood with insoluble, incombustible material—involves impregnating wood 2 aq. solns. whose ingredients mix and fix with each other in wood tissue"; JP 63159008; Date: Jul. 7, 1988.

Derwent Abstract: "Fire retardant wood prodn.—by impregnation with insol. inorganic cpd. using metal cation soln. and anion soln. forming insol. cpd. on reaction"; DE 3630139; Date: 1987.

Derwent Abstract: "Fireproofing of pulp and wood—with aluminium phosphate silicates"; JP 48046195; Date: 1973.

(List continued on next page.)

*Primary Examiner*—Leszek Kiliman

(74) *Attorney, Agent, or Firm*—Ahaji K. Amos; Thompson Coburn, LLP

(57) ABSTRACT

A process for preparing a fire-resistant cellulosic material which comprises contacting cellulosic material with an aqueous solution of aluminum phosphate wherein the molar ratio of aluminum to phosphorous is less than 1:1, optionally containing a metal oxide, to form an initially treated cellulosic material containing aluminum phosphate and an increased amount of water, removing water from and curing said initially treated cellulosic material to form a fire-resistant cellulosic material. The cellulosic material is preferably wood and the wood is preferably a shingle or plywood.

9 Claims, No Drawings

OTHER PUBLICATIONS

Derwent Abstract: "Wood compsn. for mfg. heat–insulating and constructional prods.—contains alumino:phosphate binder, cuprous oxide additive and supplementary malonic acid improve properties"; SU 1201268; Date: 1986.

Derwent Abstract: "Fireproofing soln. for wood–fibre materials—cont. phosphoric acid urea, dicyanodiamide, resin adduct and aluminium chromium phosphate soln."; SU 501887; Date: 1976.

Derwent Abstract: "External protection of various materials, esp. against fire—by coating with phosphate cement"; ES 8606457; Date: 1986.

Derwent Abstract: "Prepn. of modified wood of high dimensional stability and flame retardance—by scattering, impregnating and curing cation contg. cpd. on surface and on other surface, cation contg. cpd., to form water insol cpds"; JP 6218707; Date: 1994.

Derwent Abstract: "Prepn. of modified wood material—by impregnating with at least two aq. solns. of water–sol. inorganic cpds. which form water–insol. and non–flammable cpds."; JP 2116510; Date: 1990.

Derwent Abstract: "Fireproof door—with hollow filled with paste of aq. acid, anhydrous alkaline silicate, metallic foaming substance and foam stabiliser"; JP 83006707; Date: 1983.

Derwent Abstract: "Fire retardant organic material—impregnated with compsn. contg. water glass, alum, aluminum salt of wead acid and water"; JP 52068794; Date: 1977.

Derwent Abstract: "Fire resistant inorganic laminates mfr.—by coating board with sodium silicates, calcium oxide, aluminum phosphate, water and laminating with second board"; JP 50100114; Date: 1977.

Derwent Abstract: "Fireproofing agent for fibreboards and laminates—produced by decomposing aluminosilicate with phosphoric acid and neutralising with urea"; SU 490663; Date: 1976.

Derwent Abstract: Lapina, L.M.; Usacheva, N.I.; Kizas, A. Yu.; "etal ammonium phosphates. Production of iron and aluminium phosphates"; Issled. Khim. tekhnol. Udobr., Pestits., Solei (1966), 265–74.

Derwent Abstract: Makovskii, Yu. L.; Krasovskii, N.G.; "Atomic–absorption analysis in the study of modification of wood fibers by aluminum chromium sulfates"; Izv. Vyssh. Uchebn. Zaved., Lesn. Zh. (19090), (5), 128.

* cited by examiner

FIRE RESISTANT CELLULOSIC MATERIALS

This application is a divisional of application Ser. No. 09/066,634, filed Apr. 24, 1998, now U.S. Pat. No. 6,235,347 which claims the benefit of priority under 35 U.S.C. §119(e) of provisional application No. 60/044,926, filed Apr. 25, 1997.

This invention relates to a process for fire resistant cellulosic materials and rendering cellulosic materials leach resistant. More particularly, the invention relates to a process of using aluminum phosphate to make wood fire resistant and render such wood leach resistant. This invention relates also to a composition comprising cellulosic materials and aluminum phosphate which is fire resistant.

BACKGROUND OF THE INVENTION

Wood, a natural cellulose material, is used in home construction in roofing, frames, support and plywood; however, wood has use restrictions in roofing as there is no approved commercial fire resistant treatment. If homes were not protected with nonflammable roofs, a fire could easily jump from house roof to house roof, especially with high winds.

Effective fire resistant treatment of wood for both exterior and interior uses under conditions of leaching and weathering is needed because desirable properties of wood must be preserved after initial fire resistant treatment.

Fire retardants are added or applied to a cellulosic materials such as wood products to increase the resistance of that cellulosic material to fire. Such materials are less flammable than the cellulosic (wood) they protect. Some fire retardants prevent the spread of flame; others burn and thereby create a layer of char that inhibits further combustion. At the same time, some organic fire retardants may produce fairly toxic gases during exposure of the treated material to fire temperatures which may present problems for persons caught inside a burning building and for fire fighters.

The chemicals in a fire resistant composition determine how it works. Most flame retardants contain elements from any of three groups in the Periodic Table of Elements (Group IIIa (including boron and aluminum), Group Va (including nitrogen, phosphorus, arsenic, and antimony), and Group VIIa (including fluorine, chlorine, and bromine). Aluminum (sometimes as aluminum oxide) increase the amount of char formed in the early stages of a fire. This char forms a protective layer that prevents oxygen from reaching the inner layers of the protected material and thus sustaining the fire.

Phosphorus is a flame retardant in its solid and liquid phases which works by forming a surface layer of protective char on wood. Compounds of phosphoric acid are most frequently used as flame retardants for the first class of materials. On heating, sometimes phosphoric acid reacts with the cellulose to produce large amounts of carbon char and incombustible gases, such as steam and carbon dioxide, which either prevent fire from starting or smother it.

Various U.S. Patents disclose concepts for reportedly rendering wood flame proof. These patents include U.S. Pat. No. 4,981,518 issued to Melvin H. Sachs on Jan. 1, 1991 which discloses a cellulose filler material, such as wood chips, which are rendered nonflammable by encapsulation within a binder which is formed in an exothermic reaction from mixing a powdered base metal oxide and a weak acid, such as aluminum phosphate, which may be in the form of an acidic solution. This patent further discloses a method of making the bonded composite structure including the steps of mixing the weak acid and powdered base metal oxide, encapsulating the fibrous cellulose material within the binder and rendering the fibrous cellulose material nonflammable, thereby forming the slurry mixture into a predetermined form and setting the formed mixture into a solid.

U.S. Pat. No. 4,857,365 which issued to Shozo Hirao et al. on Aug. 15, 1989 and U.S. Pat. No. 4,731,265 which issued to Shozo Hirao et al. on Mar. 15, 1988 disclose a modified wood which is reportedly produced by reacting two water-soluble solutions, one with cations (selected from a group containing aluminum) and one with anions (from a group containing phosphoric acid) which react to form an insoluble, nonflammable, inorganic compound. A method of manufacturing a modified wood material is disclosed in these patents which reportedly can position within a raw wood material, an insoluble, nonflammable, inorganic compound using a highly efficient reaction achieved between cations and anions by sequentially immersing the raw wood material at least three times alternately in each of, and different one from that employed immediately before of a first water-soluble, inorganic substance solution containing cations and a second water-soluble, inorganic substance solution containing anions.

JP 63159008 discloses modified wood which is impregnated with insoluble, incombustible material using two aqueous solutions. A physical stimulus, which may be microwave heating, is given to the wood to promote formation of the insoluble material. Ions with a (3+) charge may be in one solution and phosphate ions in the other.

JP 48046195 discloses that pulp and wood are fireproofed with aluminum phosphate and silicates.

Aluminum phosphate has been manufactured in the United States since the late 1940s. While there is prior art as to compositions for fireproofing wood, including some compositions containing aluminum and some compositions containing phosphorus, a more efficient process and composition for fire resistant wood and rendering it leach resistant is provided herein using aluminum phosphate.

OBJECTS OF THE INVENTION

It an object of the invention to provide a treated cellulosic material which has improved fire-resistant and leach-resistant properties.

It is a further object of the invention to provide a process for preparing a wood shingle and plywood compositions having improved fire-resistant and leach-resistant properties.

It is another object of this invention to provide an aluminum iron phosphate composition which renders wood fire resistant and leach resistant.

The above and other objects are achieved in this invention more particularly described in the specification hereinafter following.

BRIEF DESCRIPTION OF THE INVENTION

This invention comprises a process for contacting a cellulosic (wood) product with an aqueous solution of aluminum phosphate wherein the molar ratio of Al:P ranges from less than 1:1, optionally containing a metal oxide component, which is followed by removal of water (such as by evaporation) from the cellulosic (wood) product and subsequent curing of the dried cellulosic (wood) product to produce a treated cellulosic product. The cellulosic treated (wood) product is thereby rendered flame proof. (As employed herein, the abbreviation "Al" means aluminum and "P" means phosphorous.)

This invention further comprises a cellulosic material on which is deposited aluminum phosphate and (optionally a metal phosphate) which has been cured to form a condensed phosphate and wherein the chain length (n) ranges from about 10 to about 10,000.

DETAILED DESCRIPTION OF THE INVENTION

This invention comprises a process for preparing a fire-resistant cellulosic material which comprises contacting cellulosic material with an aqueous solution of aluminum phosphate wherein the molar ratio of aluminum to phosphorous is less than 1:1, to about 0.02–0.7 to 1, and more preferably from 0.3–0.4 to 1, optionally containing a metal oxide such as ferric/ferrous oxide, to form an initially treated cellulosic material comprising aluminum phosphate and optionally iron phosphate and an increased amount of water, and removing excess water from and curing said initially treated cellulosic material to form a fire-resistant cellulosic material. The cellulosic material is preferably wood and the wood is preferably a shingle or plywood. In practicing the process of this invention, preferably a single solution is employed which comprises aluminum phosphate, although separate solutions containing aluminum ions and another solution containing phosphate ions could be employed if desired. This invention also comprises a cellulosic material on which is deposited aluminum phosphate and (optionally a metal phosphate) which has been cured to form a condensed phosphate and wherein the chain length (n) ranges from about 10 to about 10,000. The term "deposited" includes deposited, in contact with, on, in, within and the like.

A metal oxide is generally employed in this process and typically the aluminum phosphate/metal phosphate aqueous composition is deposited on or impregnated in a cellulosic material such as wood by contact, ultrasound, vacuum/pressure or heat treatment. This impregnation is followed by evaporation of the water at the boiling temperature of the phosphorous solution, and then curing by heating the treated cellulosic material to provide the treated cellulosic material product.

As employed herein, the term "cellulose" includes the complex carbohydrate $(C_6H_{10}O_5)_m$ that is composed of glucose units and which forms the main constituent of the cell wall in most plants, including woody plants such as trees, and includes those cellulosic materials on which one can cure the phosphate compositions used in this invention. As employed here, the term "wood" includes without limitation softwood and hardwood and products made in part or whole from wood or a part thereof, including plywood and oriented strand board, shingles and shakes, and paper and paper products which are especially preferred cellulosic materials useful in this invention and includes those wood materials on which one can cure the phosphate compositions used in this invention.

Further as employed herein, the term "fire-resistant" means highly resistant to fire such as when cellulosic material is exposed to a flame.

Also as employed herein, the term "leach resistant" means having the capability to retain aluminum phosphate after subsequent contacting with water.

More particularly, this invention is carried out in a process whereby wood (as a preferred cellulosic material) is preferably soaked in an aqueous solution of aluminum phosphate with an $Al_2O_3$—$P_2O_5$ molar ratio preferably of about 0.33+/−0.1 in an initial process step.

The aluminum phosphate solution is maintained at or heated to a temperature from about 60° C. to about 100° C., preferably from about 80° C. to 90° C., by the addition of a suitable amount of heat as necessary using a suitable, convenient method of heating. The wood to be treated is added to the aluminum phosphate solution or the aluminum phosphate solution is added to the wood. The heating to effect curing of the aluminum phosphate may be carried out by a conventional means known to those of skill in the art after reading this specification.

The concentration of aluminum phosphate in the solution is generally from about 0.5% by weight to about 45% by weight solids of the total solution and preferably from about 5% by weight to about 20% by weight although greater or lesser concentrations may be employed if desired.

The number of repeating units of aluminum condensed phosphate formed as a result of curing is conveniently herein designated as (n), wherein n is an integer varying from about 20 to about 100 or more, wherein the molar ratio of Al:P is less than 1:1, preferably from 0.2 to 0.7 to 1, and most preferably from 0.3 to 0.4 to 1. Aluminum phosphate solutions are described in 1 and 2 J. R. VAN WASER, PHOSPHORUS AND ITS COMPOUNDS (Interscience Publishers, 1961), which is incorporated herein by reference in its entirety.

The elapsed time during which the wood is contacted with aluminum phosphate solution depends to a large extent on the size of the wood to be treated but illustratively with the sizes of wood employed in the Examples of this invention the contact time is from about 5 minutes to about 300 minutes and more preferably from about 15 minutes to about 60 minutes or so. Those of skill in the art will recognize that greater or lesser amounts of contact time may be employed and that the time of contacting will vary with the type of wood and the size of the piece of wood employed. Those of skill in the art will recognize that the amount of time preferred is that time which will afford sufficient and effective contact time of the wood with the aqueous solution containing the aluminum phosphate. Generally, the amount of contact time preferred is that time needed "to soak" the wood in the aluminum phosphate solution. Preferably the contact time of the wood and the phosphate solution is such that a single contact of wood and phosphate solution using the particular method of contacting is sufficient.

The wood is preferably placed within the phosphate solution so as to afford the maximum amount of wood and phosphate in contact with one another. The wood may be dipped in the phosphate solution one or more times or may be allowed to remain in the phosphate solution and soak but a single contact or dip is preferred. Any convenient method of contacting the wood and the phosphate solution may be employed, including without limitation, applying a vacuum to the wood, applying pressure to the solution in contact with the wood, dipping, soaking, brushing by brush or by using vacuum, using pressure, air brushing, spraying, splashing, pouring the aluminum solution over wood and the like, although soaking is the preferred method. Even and thorough contacting of the aluminum phosphate solution with the wood is desired for a uniform fire-resistant and leach-resistant product of this invention. The wood may remain in a stationary position while it is in contact with the phosphate solution or the wood may be moved during such contact. A single contact of the wood with the aluminum phosphate solution is sufficient providing that the contact is thorough, uniform and the time is sufficient for the contact to have occurred.

Typically, the wood to be treated is debarked and has an unfinished surface wood allowing for the phosphate solution to be taken up by the wood so that a relatively high uptake of aluminum phosphate will be accomplished. A vacuum pretreatment of the wood is preferred.

The wood is removed from the phosphate solution with which it has been in contact after a sufficient contact time and is allowed to air dry until the surface of the wood seems substantially dry to the human touch, perhaps for a time of about one hour or more or less. This initially treated wood may be placed in a vacuum oven to begin curing so that the temperature therein is in the range from about 30° C. to about 80° C. or so although greater or lesser temperatures may be employed if desired. This provides dried wood which is preferably uncharged and not burned.

The dried wood being treated can also be placed in a microwave oven and irradiated for about 20 to 40 seconds or so, preferably on full power, to remove more of the initial water without burning or charring the wood being cured. Those of skill in the art will recognize that the purpose of using the microwave energy from the microwave oven is to impart energy to the wood so that a major portion of water is evaporated therefrom and to be able to apply heat to the wood without charring or burning it. However, any convenient means of removing water may be employed as those of skill in the art will readily recognize and use of a microwave oven or equivalent to supply energy for water removal is also convenient.

Typically, the full power or wattage of a preferred microwave oven is about 900 watts, although greater or lesser wattages may be employed as for larger or smaller amounts of wood being heated. The curing time may be about 40 seconds or so and this heat cycle may be repeated three-four times or so when treating shingles of about 10 cm×10 cm. dimensions. Those of skill in the art will recognize that different brands and types of microwave ovens will have different levels of high wattages and therefore the curing time and curing cycle may vary. In all instances, a sufficient curing time and sufficient cycle is employed.

The time to remove the water is that elapsed time which will be needed as a result of selecting an effective method of water removal and the rate of application of heat or alternative energy means. A sufficient time is employed for water removal and curing. Preferably, the water is removed from the initially treated wood before curing, although such is not required.

This invention is an effective exterior-type fire-resistant and leach-resistant treatment which can be made to red cedar shingles using aluminum-iron phosphate. The process of this invention may also be used for other exterior and interior cellulosic materials.

Typical metal oxide components which may be employed in practicing this invention include ferric/ferrous oxide, ferric oxide, cupric oxide, and zinc oxide (1.23% of a mixture of 3 parts of zinc oxide, 1 part of titanium dioxide and 0.33 parts of silica), mixtures thereof and the like. Ferric/ferrous oxide is the preferred metal oxide component of this invention. Aluminum phosphate is the preferred phosphate with n about 20 (n is the integer representing chain lengths of condensed phosphate).

Those of the skill in the art will recognize that other components may be present in the aluminum phosphate solutions including urea, melamine, dicyandiamide, boric acid, mixtures thereof and the like.

In practicing this invention, it is preferred to produce after drying and curing a composition comprising aluminum condensed phosphate wherein n is about 100 and the metal oxide component is ferric/ferrous oxide.

In a preferred mode, an aluminum-iron phosphate may be deposited on wood by a vacuum/pressure impregnating procedure under overall positive pressure, particularly under pressure from about 5 lbs. to about 35 lbs. per square inch for a period of time from about 0.5 hour to about 1.0 hour to impregnate the wood with aluminum phosphate followed by evaporation of water, acting as solvent for the phosphate, and then curing the treated wood in a microwave oven.

The range for suitable vacuums useful in practicing this invention is from about 0.1 mm Hg to about 50 mm Hg and more preferably from about 5 mm Hg to about 20 mm Hg, although greater or lesser vacuums may be employed as desired.

The range for pressures useful in practicing this invention is from about 5 psig to about 35 psig and more preferably from about 10 psig to about 30 psig, although greater or less pressures may be employed if desired.

After treatment with the process of this invention, the wood may be finished in any desired manner such as by applying paint or another finishing substance or left unfinished.

Without being bound by theory, it is believed that the curing process herein polymerizes water soluble aluminum phosphate or aluminum iron phosphate into a water insoluble aluminum condensed phosphate or aluminum iron condensed phosphate which remains on or in the treated cellulosic ( wood) product. This process releases water of composition. Further, without being bound by theory, it is believed that the practice of this process results in a cellulosic material on which is deposited aluminum phosphate and (optionally a metal phosphate) which has been cured to form a condensed phosphate and wherein the chain length (n) ranges from about 10 to about 10,000. An additional metal condensed phosphate may also be deposited on the cellulosic material as a result of employing an optional metal phosphate in the process of this invention.

The following Examples illustrate the best currently known mode of practicing the instant invention and are described in detail merely in order to facilitate a clearer understanding of the invention. It should be understood, however, that the detailed expositions of the application of the invention, while indicating preferred embodiments, are given by way of illustration only and are not to be construed as limiting the invention since various changes and modifications within the spirit of the invention will become apparent to those skilled in the art from this detailed description.

EXAMPLES

In the Examples which follow, aqueous solutions of aluminum phosphate were impregnated into wood and the wood ultimately converted to a leach-resistant state by microwave curing of the impregnated wood without serious impairment of the desirable wood properties such as durability, weathering ability and strength. Without being bound by theory, it is believed that the inventive composition employed herein reacts or interacts in some fashion with the wood cellulose structure to give permanence of the treatment.

Example 1

Example 1 illustrates a first embodiment of this invention.

Wood having an unfinished surface and illustrative of a preferred cellulosic material was soaked in a solution containing aluminum phosphate having an $Al_2O_3$—$P_2O_5$ ratio of about 0.33+/−0.1. The aluminum phosphate solution was heated to a temperature of about 100° C. and the wood was placed in the aluminum phosphate solution of about 10% solids by weight of the total solution for about 20 minutes. A single contact of the phosphate solution was made with the wood. This initially treated wood was removed from the aluminum phosphate solution and allowed to air dry until the surface was dry to the human touch for about one hour, thus, providing an air-dried sample of wood. The air-dried sample of wood was then placed in a microwave oven, which was turned on high power, and irradiated for about 20 seconds to drive out initial water of composition without burning the treated wood and to effect curing of the treated wood. Next, the treated wood was cooled and then heated again for about 20 seconds, being careful not to burn the treated wood. This cooling and heating was repeated several times, each time being careful not to burn the wood. The treated wood, after being splintered, would not support combustion while splinters of a companion sample of untreated wood burned very readily with a bright flame when a lit match was held to the splinters of untreated wood.

Example 2

Example 2 is illustrates a second embodiment of this invention.

Part A: Preparation of Aluminum Phosphate Solution

Aluminum phosphate solutions were prepared starting with the ratio of Al to P corresponding to chain length of n=100 ($Al_2O_3$—$P_2O_5$ ratio is 1:2.94) with some exceptions for chain length 20 ($Al_2O_3$—$P_2O_5$ ratio is 1:2.72). Several metal oxides were added to a hot or boiling aqueous solution of phosphoric acid in such amount to obtain aluminum metal condensed phosphates with chain length n=20. The amounts of metal oxides employed in the phosphate solution were limited by their different solubilities in the phosphate solution. A single solution containing aluminum phosphate was employed in this Example.

Several samples were made for preliminary testing of metal oxides: ferric/ferrous oxide (3.06% in respect to solid); ferric oxide (2.5%); cupric oxide (1.3%); and zinc oxide (1.23% of mixture 3 parts of zinc oxide, 1 part of titanium dioxide and 0.33 parts of silica). Other additives were employed as: 10% to 20% of urea (U), melamine (M) and dicyandiamide (DCDA) were added, and in the formulation with 20% urea, 1% of boric acid was also employed. All parts herein are parts by weight unless otherwise stated.

All samples taken of these Examples were analyzed by simultaneous differential thermal analysis (DTA) and thermogravimetric analysis (TGA) under the same conditions. These data were used to control the possible changes in curing temperature for aluminum phosphates. All samples had a similar pattern to aluminum phosphates with n=100. The thermal analysis (DTA) method and the thermogravimetric analysis (TGA) methods employed herein is disclosed in Encyclopedia of Industrial Chemical Analysis, Intersci. Publishers, NY, L., Sydney, Ed. F. D. Snell, C. L. Hilton, Volumes 1 and 3, 1966 and is incorporated herein in its entirety by reference.

Part B: Treatment

Shingles (unfinished) used in this study were red cedar. Shingles were cut into pieces about 100 mm×100 mm in dimension, about 6–11 mm thick, and treated by contacting with 10% by weight solutions of aluminum phosphate prepared as described above. The size of the test specimen is prescribed by ASTM E 1354-90 Burning-Brand Test. Different species and pieces of the same species have different thicknesses. The samples were selected to include wood from different sections with average thickeness.

To insure a good bond of aluminum phosphate to treated wood, the shingles were oven-dried or vacuum oven dried just prior to treating. (This surface treatment improved the weathering properties.) While preferred treatment methods for shingles include impregnation, pressure impregnation, impregnation in ultrasound field, spray coating, brush coating, after-treatment water spraying in this Example, only impregnation, impregnation in an ultrasound field, and vacuum/pressure impregnation were used. In some instances, depending on the size and shape of the cellulosic being treated by the process of this invention, one of skill in the art may employ spray coating and brush coating of the cellulose.

Shingles were soaked in a hot 10%-by-weight solution of aluminum phosphate solution for about 1 hour, followed by overnight air drying and about 1 hour kiln drying (at temperature below 150° F. to prevent the collapse of the cedar cellular structure). The best results were achieved with vacuum/pressure treatment when the wood was placed in a treating vessel, the system evacuated to 10 Hg mm of vacuum and held for about 0.25 to about 1.5 hours. The treating solution was introduced and pressure up to 25 psig was maintained for about 1 hour at temperatures up to 75° C.

The treated specimen of wood took up in average 4–16% of aluminum phosphate on a dry weight basis based on a single contact with the aluminum phosphate solution. The treated wood was then air and kiln-dried and cured in a microwave oven with output power 900 Watts (4–5 specimens four times heating and cooling cycle for about 40 seconds each part of each cycle). After that, samples were exposed to the air for conditioning overnight. During microwave curing, the shingles were observed for any changes in their physical appearance. At each step, shingles were weighed to evaluate the percent of solid (phosphate) uptake and percent of drying and curing. Preliminary testing of samples for leaching ability showed a good degree of curing (shingles did not loose their weight after about 1 hour and about 2 hours immersion in ultrasound water bath). See Table pages 20–22 hereinafter.

Part B: Treatment of Shingles with Aluminum Phosphates (Cont'd.)

The uptake of aqueous solution of aluminum phosphates appears to be directly related to the method of treatment. In the initial step, shingles were treated by immersing at different temperatures, by brushing, by exposing the shingles to an ultrasound bath and placing the shingles under vacuum and pressure. Both the method of treatment as well as curing influence the degree of penetration and chemical structure of aluminum phosphate on the wood. The uptake varied with the time and temperature of treatment. When shingles were soaked at 90° C. for about 1 hour, the percent of uptake was between 4 and 9%. Using ultrasound, the uptake may be increased under the same conditions up to 12%. The most noticeable improvement in fire resistance is achieved under a vacuum/pressure treatment, when wood cells of shingles were purged of volatile components in vacuum (at 90° C.) and when the wood was pretreated as described above to provide a greater uptake amount of aluminum phosphates by 22%.

The visual appearance of shingles, particularly after drying and curing, depended on the composition of aluminum phosphate solutions. For chain length n=100, sometimes degradation of wood (as black spots) occurred, while for chain length n=20, shingles kept their natural light color. This phenomena showed the degradation of wood under acidic conditions.

Ionic aluminum phosphate solutions with different chain lengths (i.e., n ranges from 4 to 2000) were prepared and their pH (depending on the chain length) was studied for 1% w/w and 10% w/w concentration solutions. The acidity raises from 2.46 to 2.13 upon the increasing of chain length:

| | n | | | | | | | | | | |
|---|---|---|---|---|---|---|---|---|---|---|---|
| | 6 | 10 | 20 | 50 | 75 | 100 | 150 | 200 | 500 | 1000 | 2000 |
| pH | 2.46 | 2.40 | 2.40 | 2.24 | 2.22 | 2.20 | 2.20 | 2.20 | 2.19 | 2.16 | 2.15 |

The acidity of solution with n=100 is higher than for solution with n=20 and the difference is important to prevent the wood from degradation when treating it with smaller chain length.

Part C: Aluminum Phosphate Curing

Microwave curing was employed to avoid destroying wood structure at high temperature. The time of curing depended on the size of specimens as larger specimens required larger curing times. The drying step is necessary before curing to get rid of the solution and hydration water. At this stage, the weight of wood may only slightly exceed the preliminary weight of untreated wood. After proper curing, samples retain their weight upon treating by water in ultrasound field for about 1 hour to about 2 hours.

Part D: Evaluation for Fire Resistance

To determine the effectiveness of practicing this invention in this Example, the evaluation of fire-resistant treatment with ASTM E 1354-90 "Standard Test Method for Heat and Visible Smoke Release Rate for Materials and Products Using Oxygen Consumption Calorimeter" which is incorporated herein in its entirety by reference, was used to determine the ignitability, heat release rates, mass loss rates, effective heat of combustion, and visible smoke development of materials revealed the considerable improvement in ignitability (twice higher than for untreated material about 60 seconds versus about 25–35 seconds) and close to currently used asphalt shingles (about 70 seconds and about 90–100 seconds); mass loss (50% versus 80% ); heat-released peak value (20 kJ versus 150 kJ); total smoke, CO and $CO_2$ yields (smoke 0.4 $m^2$ versus 180 $m^2$ for untreated shingles and greater than 1550 $m^2$ for asphalt shingles).}

The ASTM E 1354-90 test used in screening work is a vigorous analysis of flame tests in terms of geometry and relation of heat source to flame direction. It provides for measuring the response of materials exposed to controlled levels of radiant heating with or without the external ignitor. The specimen orientation is a horizontal one. The test heat flux (the incident flux imposed external from the heater on the specimen at the initiation of the test) was 35.0 $kW/m^2$ ( heat release rate per unit area). This rate was identified as the most suitable one in a special testing experiment when blank shingles were submitted into testing conditions with different flux rate (from 10 to 80 $kW/m^2$). The test was also performed for control untreated shingles which were and were not additionally dried and for asphalt shingles which are widely used in residential construction.

Part E: Evaluation Weight Loss

The percent of weight loss of wood specimen is defined as a numerical ratio of final specimen mass loss to initial specimen mass using ASTM 1354-90. A smaller this ratio is desired in that it shows a lower weight loss during the burning test so that flaming sustainability is improved.

For untreated samples, this value depends on the dryness of the wood. At ambient conditions it is 79%. If shingles were dried in microwave oven about 24 hours before testing, the percentage was on 2% higher. All treated samples had smaller weight loss (up to 64% for specimens treated with aluminum phosphates with addition of $Fe_3O_4$ under soaking and ultrasound field conditions). It was noticed that the addition of 10% of DCDA and 1% of boric acid also delayed the weight loss. The best results were obtained for vacuum/pressure treated samples, especially with addition of iron oxides when the weight loss was reduced up to 50% and was improved on 30% in respect to untreated shingles.

It should be also mentioned that remarkable difference was also achieved for mass loss rate (kg/s). This parameter is very important because it characterizes the fire spreading ability. For untreated shingles, the major weight loss occurred much earlier (within about first 290 seconds) towards treated shingles which have steady weight loss upon the time (for the best sample, the weight loss after about 290 seconds is nearly 30%).

Part F: Evaluation—Time to Ignition (Ignition Time, Sec.)

Ignition occurs when a material is heated above the ignition temperature. Ignitability is determined as a measurement of time from initial exposure to time of sustained flaming. The propensity to ignite is measured in seconds at a specified heating flux. Although this characteristic is considered as very important for roof materials, wood shingles have very short ignition time in respect to asphalt ones: from about 30 seconds for wood to about 70 to about 100 seconds for asphalt shingles.

The most noticeable improvement was obtained for vacuum/pressure treated shingles with aluminum-ferric-ferrous phosphates, the best result being about 75 seconds. This was comparable with values obtained for asphalt shingles.

Part G: Evaluation—Heat Release Rate (Heat Release Peak)

In most fires, there is a time delay between ignition and rapid combustion. Speed of flame propagation over the surface of a combustible critically affects the severity of fire. Heat release rate indicates the relative rate of flame spread on the specimen material. This is the heat evolved from the specimen per unit of time. It is determined by measurement of the oxygen consumption as determined by the oxygen concentration and the flow rate in the exhaust product stream.

The peak value of heat release rate is very high for asphalt shingles and twice lower for untreated wood shingles. Considerable improvement was achieved for vacuum-pressure treated samples (10 times less than for asphalt shingles). The average rate for untreated shingles is higher than for asphalt ones and only for vacuum pressure-treated samples the rate is 3–6 times less than for untreated specimens.

Part H: Evaluation—Effective Heat of Combustion

Effective heat of combustion is determined from a concomitant measurement of specimen mass loss rate, in combination with heat release rate. Cellulosic products typically show more than one mode of degradation and a varying effective heat of combustion. The same is true for composites like asphalt shingles. For both types, the test showed a few modes of degradation. As a result, the consideration was given to maximum values.

Asphalt shingles have very high and beyond scale effective heat of combustion. The impregnation of wood shingles with aluminum phosphates considerably reduced this value, and with vacuum-pressure impregnation it was reduced up to single numbers. That means that the process of this invention is particularly important for interior treating of wood.

Part I: Evaluation—Smoke and Fume Release

The burning of any combustible material involves the degree of smoke and noxious gases. The combustion process with wood causes the production of water vapor and the combining of oxygen and carbon to form carbon dioxide and carbon monoxide. It also produces a wide range of aldehydes, acids and other gases. In the test employed, the smoke, carbon dioxide and monoxide release rates and actual amount evolved are measured. The smoke release is measured by the smoke obscuration, or in other words, by light attenuation—reduction of light transmission by smoke.

Despite the smaller weight loss, asphalt shingles not only develop a great heat release upon burning but also produce smoke, fume and toxic gases. With wood shingles, the smoke area is 10 times less for each kg up to 70–90 $m^2$/kg. When aluminum phosphates are added, smoke and toxic gases evolving may be reduced to 2–20 $m^2$/kg.

Part J: Evaluation for Leaching

The leaching ability was tested in an ultrasound bath (1 hour and 2 hour). Shingles are properly cured when they retain their weight after air drying.

From the testing for leaching the samples were placed in a water bath under ultrasound for about 1 hour to about 2 hours but this did not affect their weight.

Part K: Evaluation

Results obtained revealed that red cedar shingles treated with aluminum-ferric-ferrous phosphates have (for the majority of data points) lower fire risk than asphalt shingles.

Although the invention has been described in terms of specific embodiments which are set forth in considerable detail, it should be understood that this description is by way of illustration only and that the invention is not necessarily limited thereto, since alternative embodiments and operating techniques will become apparent to those skilled in the art (in view of the disclosure). Accordingly, modifications are contemplated which can be made without departing from the spirit of the described invention.

What is claimed is:

1. A cellulosic material on which is deposited aluminum phosphate that has been cured to form a condensed

TABLE

Data of Combustion Test

| SHINGLE MATERIAL | TREATMENT | % Weight Loss | Ignition Time, Seconds | Heat Release, Peak, BTU/Hr | Heat Release, Rate, $kW/m^2$ | Eff. Heat of Combustion, MJ/kg | Specific Ext. Area, $m^2$/kg | CO, kg/kg | $CO_2$, kg/kg | % Uptake |
|---|---|---|---|---|---|---|---|---|---|---|
| WOOD | | | | | | | | | | |
| Untreated | NONE | 79.1 | 35 | 122.15 | 67.2 | 47.9 | 89.05 | 0.035 | 1.18 | — |
| Untreated and dried | NONE | 80.95 | 27.5 | 158.7 | 54.65 | 45.05 | 73.45 | 0.0385 | 1.26 | |
| ASPHALT | NONE | 19.7 | 70 | 204.23 | 48.13 | *>150 | 803.8 | 0.108 | 2.1 | |
| | | 35.8 | 97.5 | 239.7 | 81 | *>150 | 714.75 | 0.0443 | 1.8 | |
| WOOD | All Samples Below Were Chemically Treated with Al:P | | | | | | | | | |
| Wood, Soaking | n = 100 | 70.35 | 37.5 | 99 | 44.4 | 41.85 | 66.08 | 0.073 | 0.99 | 7.2 |
| Wood, VP | n = 100 | 59.1 | 20 | 55.652 | 22.56 | 12.87 | 6.74 | 0.28 | 0.3845 | 15.11 |
| Wood, Soaking | n = 20 | 73.3 | 15 | 106.4 | 45.5 | 13.37 | 48.3 | 0.0834 | 0.96 | 7.9 |
| Wood, VP | n = 20 | 53.85 | 25 | 32.4 | 17.045 | 6.125 | 2.66 | 0.117 | 0.262 | 21.6 |
| | Additives Added | | | | | | | | | |
| Wood, Soaking | M + U 10% | 77.3 | 22.5 | 102.5 | 45.3 | 12.75 | 41.4 | 0.0165 | 0.66 | 5.9 |
| | Additives | | | | | | | | | |
| Wood, Ultrasound | U + $H_3BO_3$ | 68.1 | 33.5 | 82.8 | 35.5 | 10.6 | 13.5 | 0.0802 | 0.835 | 10.2 |
| Wood, Ultrasound | DCDA | 67.2 | 20 | 90.15 | 39 | 11.8 | 21.05 | 0.0767 | 0.885 | 12.5 |
| Wood, Ultrasound | $Cr_2O_3$ | 71.6 | 22.5 | 104.6 | 45.45 | 13.25 | 11.9 | 0.0797 | 1.04 | 6.9 |
| Wood, Soaking | $Fe_3O_4$ | 63.9 | 27 | 94.9 | 39.4 | 11.13 | 22 | 0.0741 0.8 | 0.8 | 9 |
| Wood, VP | $Fe_3O_4$/VP | 50.55 | 50 | 20.96 | 11.22 | 3.22 | 16.59 | 0.0705 | 0.132 | 19.9 |
| Wood, Soaking | CuO | 73.8 | 23 | 117.1 | 54.8 | 13.9 | 68.1 | 0.0609 | 1.04 | 4.3 |
| Wood, Soaking | FeO | 73.65 | 18 | 103.8 | 46.4 | 14.2 | 56.6 | 0.0921 | 1.05 | 5.8 |
| Wood, Soaking | ZnO | 72.07 | 22 | 109.2 | 41.7 | 13.9 | 67.8 | 0.1197 | 0.94 | 4.9 |

*Unobtainable data
**Ultrasound bath treatment
Eff. HC—Eff. heat of combustion, MJ/kg
Smoke—Specific ext. area, m2/kg phosphate, wherein the condensed phosphate formed has a chain length (n) ranging from about 10 to about 10,000.

2. The cellulosic material of claim 1 wherein said (n) ranges from about 20 to about 100.

3. The cellulosic material of claim 1 further comprising at least one metal oxide, which is deposited on said cellulosic material, which has been cured to form a condensed phosphate.

4. The cellulosic material of claim 3 wherein said (n) ranges from about 20 to about 100.

5. The cellulosic material of claim 1 wherein said cellulosic material is plywood or a paper product.

6. The cellulosic material of claim 3 wherein at least one metal oxide is selected from a group consisting of ferric oxide, ferrous oxide, cupric oxide, zinc oxide and titanium dioxide.

7. The cellulosic material of claim 6 wherein at least one metal oxide is ferric oxide.

8. The cellulosic material of claim 7 wherein said (n) ranges from about 20 to about 100.

9. The cellulosic material of claim 7 wherein said condensed phosphate is an aluminum-iron phosphate.

* * * * *

UNITED STATES PATENT AND TRADEMARK OFFICE

CERTIFICATE OF CORRECTION

PATENT NO. : 6,352,786 B2

DATED : March 5, 2002
INVENTOR(S) : Rose P. Arshinova and Edward J. Griffith, deceased, Joseph E. Griffith, executor It is certified that error appears in the above-identified patent and that said Letters Patent is hereby corrected as shown below:

Column 1,
Line 63, change “which are” to -- which is --

Column 2,
Line 8, insert -- , -- after “U.S. Pat. No. 4,857,365”
Line 9, insert -- , -- after “U.S. Pat. No. 4,731,265”
Line 11, change “which is” to -- that is --
Line 17, insert -- , -- after “these patents”
Line 22, delete “one” insert -- , -- after “immediately before”

Column 3,
Line 53, change “softwood and hardwood” to -- softwood, hardwood --
Lines 55-56, change “shingles and shakes, and paper and paper” to -- shingles, shakes, paper and paper --

Column 6,
Lines 29-30, delete “of composition”

Column 7,
Line 23, delete “is”
Line 65, change “have” to -- were of --

Column 8,
Line 25, change “in average” to -- an average of --
Line 26, delete “of” prior to the word “aluminum”
Line 61, change “of shingles” to -- of the shingles --
Line 65, change “20, shingles” to -- 20, the shingles --

Column 9,
Line 15, change “of solution” to -- of the solution -- insert -- the -- after “than for”
Line 20, insert -- the -- after “destroying”
Line 27, insert -- an -- after “water in”
Line 31, insert -- the -- before “fire”
Line 35, insert -- and -- before “mass” change “,” to -- . -- after the word “rates”
Line 36, change “effective” to -- Effective --

UNITED STATES PATENT AND TRADEMARK OFFICE

CERTIFICATE OF CORRECTION

PATENT NO. : 6,352,786 B2 
DATED : March 5, 2002
INVENTOR(S) : Rose P. Arshinova and Edward J. Griffith, deceased, Joseph E. Griffith, executor It is certified that error appears in the above-identified patent and that said Letters Patent is hereby corrected as shown below:

<u>Column 12,</u>
Line 5, insert -- , -- after "leaching"
Line 7, insert -- , -- after "hours"

Signed and Sealed this

Third Day of September, 2002

*Attest:*

JAMES E. ROGAN

*Attesting Officer* *Director of the United States Patent and Trademark Office*